March 14, 1972  G. WATERHOUSE  3,649,404
MAKING FILAMENTS WITH FIBRILS BONDED THERETO
Filed July 14, 1969

United States Patent Office 3,649,404
Patented Mar. 14, 1972

3,649,404
MAKING FILAMENTS WITH FIBRILS
BONDED THERETO
George Waterhouse, Macclesfield, England, assignor to
Ernest Scragg & Sons Limited, Macclesfield, England
Filed July 14, 1969, Ser. No. 841,449
Claims priority, application Great Britain, July 24, 1968,
29,993/68
Int. Cl. B32b 3/10, 31/18
U.S. Cl. 156—229                                           9 Claims

ABSTRACT OF THE DISCLOSURE

Filaments of man-made materials suitable for textile yarns are produced by first forming a laminate whose laminae have intermittent bonds and have different stretching characteristics, and then, before or after slitting into narrow strips, subjecting the laminate to a mechanical treatment which comprises stretching, and if desired such operations as scratching, scoring and scuffing, to cause rupture of unbonded parts of some of the laminae and the formation of fibrils on a main stem.

This invention comprises textile processes and is primarily concerned with the production of filaments of man-made materials suitable for strands and textile yarns, for instance synthetic organic thermoplastic or thermosetting materials.

According to this invention, such filaments are produced by the process including forming a laminate whereof the laminae are of like or differing such man-made materials and are bonded together intermittently, and then mechanically operating on the laminate, including stretching it, to cause irregular rupture of unbonded parts or one or more of the laminae.

Other mechanical operations which may be performed on the laminate are scratching, scoring and scuffing.

By selecting the characteristics of the laminae forming the laminate, the stretching operation, and other mechanical treatments, can give the filaments produced desirable aesthetic characteristics, for instance a feel like wool.

The laminate may conveniently be in the form of a web or sheet which is subjected to division into narrow strips before or after stretching to form filaments. The web or sheet may be produced in the flat or the laminate may be produced in tubular form and the tube slit to form the web or sheet.

The laminate may be produced in a number of ways and may have a variety of characteristics to enable the yarn filaments produced to have a continuous main stem with hair-like branches, or fibrils, along it.

Figure 1:
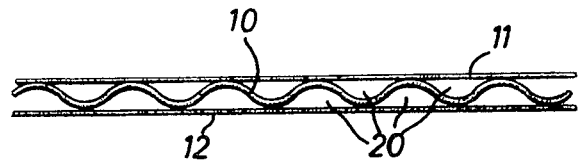
Figure 2:
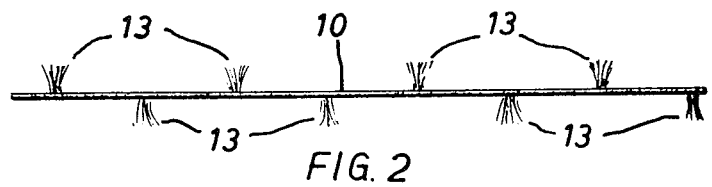
Figure 3:
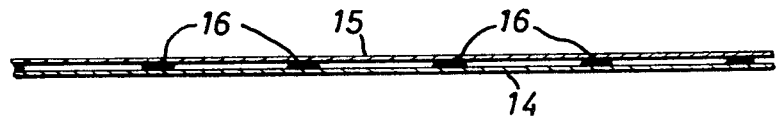
Figure 4:
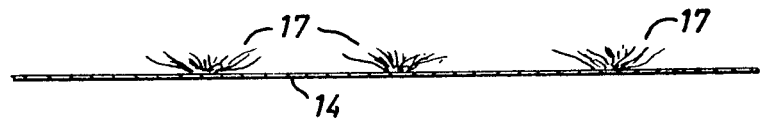

Some forms of laminate suitable for use in the invention and their processing are described with reference to the accompanying drawings, in which:

FIG. 1 illustrates diagrammatically a first laminate,
FIG. 2 illustrates the effect of stretching, and
FIGS. 3 and 4 are corresponding views of a second laminate.

In FIG. 1 a laminate has a corrugated lamina 10 whereof the crests of the corrugations are bonded to non-corrugated plain laminae 11, 12. When such a laminate is stretched, either before or after division into strips, the non-corrugated laminae 11, 12, rupture between the bonds before the material of the corrugated lamina 10 reaches its elastic limit. The result of stretching is the formation of fibrils 13 (FIG. 2).

The laminate may comprise more than one corrugated lamina, and the corrugated lamina may have a plain lamina on one side only.

Such a laminate may be produced by extrusion of webs from a plurality of orifices such that the rate of web delivery from one or more like elongated orifices, say the middle orifice of three, is greater than the rate of web delivery from the remainder. With the three-orifice arrangement a laminate as shown in FIG. 1 can be produced.

In order to avoid collapse of the corrugations the spaces 20 may have air or another gas, say under slight excess pressure, fed to them during extrusion and retained in the spaces by sealing the edges of the laminate together as by passing between pinch rollers.

In the form of laminate shown in FIG. 3, the laminate has plain laminae 14, 15 having different physical properties bonded together at 16, for instance by ultrasonic welding, the properties of at least one surface lamina being selected in relation to those of an adjacent layer so that it breaks up irregularly on stretching. By non-continuous welding of the layers as shown, a product having surface fibrils 17 (FIG. 4) can be produced.

In one example like FIG. 3, the laminate has its main web 14 of a water-quenched propylene co-polymer and its web 15 made from a low molecular weight polymer by a chill-roll casting method, which web 15 will be of lower strength. On stretching the laminate, the low strength web breaks up locally giving the surface a fibrillated nature.

It will be appreciated that since it is difficult to produce small cross-section laminates, the steps of division of a laminate into narrow strips and stretching are important. On stretching a narrow strip its length may be increased say ten times and its cross-section correspondingly reduced so permitting low denier filaments to be obtained. The formation of filaments from the laminates can be assisted by such means as forging the component webs after extrusion thereof or contouring the outermost components of the laminates as they emerge from the die. The last mentioned operation can be achieved either by the use of contoured die lips or by scoring the surfaces of the laminates as they emerge from the die.

The laminates preferably include laminae of polyethylene terephthalates, or polypropylenes, or polyamides.

I claim:

1. A process for the production of textile filaments from synthetic organic thermoplastic or thermosetting resin, which process comprises the steps of forming a sheet or web synthetic resin laminate by bonding together a plurality of synthetic resin laminae intermittently over adjacent surfaces, said laminae having differing stretch characteristics, and mechanically operating on said laminate including the step of stretching said laminate to irregularly stretch rupture the portions of at least one of the laminae between said intermittent surface bonding while not rupturing another of the laminae, and further including the step of dividing the sheet or web laminate into filaments.

2. A process according to claim 1 wherein the mechanical opeartions also include scratching, scoring or scuffing.

3. A process according to claim 1, wherein the laminate is divided into strips before stretching.

4. A process according to claim 1, wherein the laminate is divided into filaments after said stretching step.

5. A process according to claim 1 wherein the laminate comprises at least one corrugated lamina having a non-corrugated lamina bonded to the crests of the corrugations at least on one side, the characteristics of the laminae and the stretching step of the mechanical operations being selected to cause irregular rupture of each non-corrugated lamina between the bonds.

6. A process according to claim 5, wherein the laminate are of like materials.

7. A process according to claim 5, wherein the laminate is produced by extrusion of webs corresponding to the laminae form elongated orifices, the rate of delivery of each web required to form a corrugated lamina being greater than the rate of delivery of each remaining web.

8. A process according to claim 1, wherein the bonded laminae are of plane form and are selected to have different stretch properties and the stretching is effected to rupture at least one of the surface laminae of the laminate between the intermittent bonds.

9. A process according to claim 8, wherein the laminate has a main lamina of propylene co-polymer and an intermittently bonded-on lamina of a low molecular weight polymer, said main lamina having a greater stretch strength than said lamina of a low molecular weight polymer.

References Cited

UNITED STATES PATENTS

| | | | |
|---|---|---|---|
| 3,003,304 | 10/1961 | Rasmussen | 156—229 X |
| 3,094,374 | 6/1963 | Smith | 18—54 |
| 3,104,516 | 9/1963 | Field | 57—157 |
| 3,148,999 | 9/1964 | Hoffman et al. | 117—4 |
| 3,158,982 | 10/1964 | Marshall | 57—140 |
| 3,273,771 | 9/1966 | Beaumont | 225—3 |
| 3,313,668 | 4/1967 | Roullard | 156—291 |
| 3,484,916 | 12/1969 | Johnstone | 28—72.2 |

FOREIGN PATENTS

| | | |
|---|---|---|
| 1,145,982 | 3/1969 | Great Britain. |

CARL D. QUARFORTH, Primary Examiner

E. A. MILLER, Assistant Examiner

U.S. Cl. X.R.

28—72 P; 156—154, 244, 268, 271, 291, 292; 161—180